United States Patent [19]

Emmons et al.

[11] 4,138,390

[45] Feb. 6, 1979

[54] VINYL RESIN COATING COMPOSITIONS COMPRISING DICYCLOPENTENYL ACRYLATE AND/OR METHACRYLATE VEHICULAR COMPONENT

[75] Inventors: William D. Emmons, Huntingdon Valley; Kayson Nyi, Sellersville; Peter R. Sperry, Doylestown, all of Pa.

[73] Assignee: Rohm and Haas Company, Philadelphia, Pa.

[21] Appl. No.: 860,664

[22] Filed: Dec. 15, 1977

Related U.S. Application Data

[63] Continuation-in-part of Ser. No. 687,067, May 17, 1976.

[51] Int. Cl.$^2$ .................. C08K 5/33; C08L 31/02
[52] U.S. Cl. .................. 260/45.9 L; 260/879; 260/884; 260/885; 427/385 R; 428/521; 428/522; 428/523
[58] Field of Search .......... 260/879, 884, 885, 45.9 L

[56] References Cited

U.S. PATENT DOCUMENTS

| | | | |
|---|---|---|---|
| 3,053,792 | 9/1962 | Ikeda | 260/885 |
| 3,642,750 | 2/1972 | Wegemund et al. | 260/885 |
| 3,757,828 | 9/1973 | Fravenglass et al. | 260/885 |

Primary Examiner—Carman J. Seccuro

[57] ABSTRACT

This invention is concerned with certain vinyl resin coating compositions in which the vinyl resin binder or film-forming component is normally dissolved in an organic solvent which is volatilized after application of the composition to the surface of substrates to be finished. The vinyl resin component is generally of high molecular weight and it is normally difficult to obtain a reasonable viscosity in the coating composition without excessive dilution with organic solvent and the necessity to apply a plurality of coats to obtain the desired protective thickness. The present invention has been found to alleviate or reduce this difficulty in the particular solution coating compositions with which it is concerned, namely thermoplastic vinyl or acrylic polymer solutions, polyvinyl acetals, and chlorinated polyisoprene containing about 64–65% chlorine. In the compositions of the present invention, the vinyl resin is dissolved in an organic liquid vehicle which consists essentially of a non-volatile reactive monomer including dicyclopentenyl acrylate or methacrylate or comprises a predominant proportion of such non-volatile reactive monomer. Also essential components are a siccative, that is, a polyvalent metal-containing complex or salt that catalyzes the oxidative curing of the mixture of the reactive monomer and the film-forming polymeric binder, and a fugitive agent, that is, a volatile oxime stabilizer, for inhibiting the action of the oxidation catalyst. The compositions may also contain pigments, rheology-control agents, pigment-dispersing agents and other components common in the coating art.

15 Claims, No Drawings

VINYL RESIN COATING COMPOSITIONS COMPRISING DICYCLOPENTENYL ACRYLATE AND/OR METHACRYLATE VEHICULAR COMPONENT

BACKGROUND OF THE INVENTION

Bruson U.S. Pat. No. 2,414,089, Jan. 14, 1947, discloses the preparation of esters of hydroxydicyclopentadiene with unsaturated monocarboxylic acids including acrylic acid (Ex. 9), methacrylic acid (Ex. 8), and numerous other unsaturated acids mentioned in the passage of column 3, line 67 to column 4, line 24. Use of the esters as vehicles for paints, varnishes and similar coating materials is mentioned in column 4, lines 25 to 27, and in the passage of lines 62 to 75 of column 6, the linoleate (of Ex. 3) is used with a drier to form a film that is baked to form a varnish-like coating, and other unsaturated higher fatty acids are suggested for this use. The passage in lines 49 to 53 of column 4 states that the new esters may be mixed with drying oils, alkyd resins, hydrocarbons, such as rubber or cyclized rubber, and other oils and resins.

P. D. Bartlett and Abraham Schneider, J.A.C.S. 68, 6 (1946) give the correct structure of the esters produced by Bruson, which he had erroneously named as a result of his theory as to rearrangement.

Hoover U.S. Pat. No. 2,462,400, Feb. 22, 1949, discloses the preparation of copolymers of 20 to 50% by weight of dihydrodicyclopentadienyl methacrylate with saturated ($C_8$–$C_{18}$) aliphatic monohydric alcohol esters of methacrylic acid using an organic peroxide initiator. A solution of the copolymer containing a drier is then used for coating substrates, the coating being air-dried.

Dicyclopentenyl acrylate or methacrylate has been suggested for use in photosensitized coating compositions which are to be polymerized by radiation. See U.S. Pat. Nos. 3,650,669 and 3,772,062. However, such compositions require a photo-initiator system, the products are frequently lacking in durability and require the use of high-intensity UV light sources in close proximity to the coated articles to obtain the extent of curing desired or needed in a practical time for industrial operation.

Wegemund et al. U.S. Pat. No. 3,642,750 Feb. 15, 1972 discloses the production of adhesive compositions comprising liquid monomeric (meth)acrylic acid esters of an alcohol derived from a cyclopentadiene with or without other monomers and an organic peroxide or an organic hydroperoxide; these adhesives are anaerobic in that they harden under exclusion of oxygen.

Commercially available vinyl resin coating compositions of lacquer type, including impregnating versions thereof, based on solutions in organic solvents of thermoplastic vinyl or acrylic polymers, polyvinyl acetals, such as polyvinyl butyral, and chlorinated polyisoprene containing 64–65% chlorine generally provide coating or impregnating films which are often of limited hardness and toughness and are seriously lacking in one or more other properties, being especially susceptible to deterioration (yellowing, discoloration, cracking, shrinking and other distortions; decomposition, removal, and the like) by wear and abrasion, chemical attack, particularly organic solvents and alkaline materials, weathering forces, such as wind, rain, and radiation including untraviolet light rays of the sun, other natural radiation including cosmic rays, e.g., x-rays, β-rays, gamma-rays, as well as radiation emitted by all sorts of artificial means, as in lasers, x-ray machines, and radioactive materials (artificial as well as natural). Coating compositions used to make fluorescent screens in oscilloscopes, television picture tubes, and electron microscopes, are examples of compositions subject to radiation attack.

The coating compositions of the present invention comprise dicyclopentenyl acrylate or methacrylate or a mixture thereof as the entire non-volatile reactive monomer component or as a major part thereof. Either of these monomers and mixtures of them are hereinafter referred to generically as DCP(M)A, the individual acrylate and methacrylate being simply referred to as DCPA and DCPMA respectively.

By the term "non-volatile" or "essentially non-volatile" as applied to the reactive monomer(s), it is intended herein that the reactive monomer or mixture thereof must have a vapor pressure/reactivity balance under the conditions of cure, ambient or force-dry, such that no more than 5 weight percent of reactive monomer is lost by evaporation during cure of the film coatings formed from the compositions of the present invention.

These acrylic esters obtained by the addition of acrylic or methacrylic acid to one of the double bonds of dicyclopentadiene are believed to have the following formula:

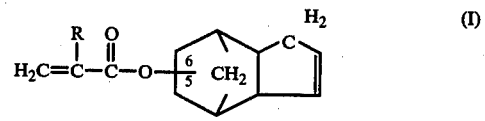

wherein R is H or $CH_3$. The (meth)acryloxy substituent may be on either the 5 or 6 position, the commercial product being a mixture of the two monomers.

The polymeric materials with which the present invention is concerned are of relatively narrowly defined scope:

(1) Thermoplastic vinyl addition polymers of one or more monomers consisting of monoethylenically unsaturated monomers having a single unsaturated group of the formula $H_2C{=}C{<}$. These solution polymers generally have a molecular weight in the range of 20,000 to 350,000 viscosity average.

(2) Polyvinyl acetals, especially polyvinyl butyral, obtained by reacting a polyvinyl acetate under hydrolytic conditions with an aliphatic ($C_2$ to $C_8$) aldehyde, such as acetaldehyde, butyraldehyde, and so on.

(3) Chlorinated polyisoprene in which there is combined in the polymer about 64–65% by weight of chlorine. Commonly called chlorinated rubber, it is not a rubber but is a hard, brittle polymer.

All three of these categories are soluble in organic solvents, being within the molecular weight range mentioned in (1) above, and commonly, coating compositions of lacquer type are based on the use of a volatile organic solvent, such as hydrocarbons or aromatic or aliphatic type, e.g., mineral spirits, benzene; toluene, xylene, ketones, such as acetone and methyl isobutyl ketone, ethers, such as ethyl ether and dioxane, halogenated hydrocarbons, such as chloroform, ethylene dichloride, perchloroethylene, and various mixtures of organic solvents.

It has been found that DCP(M)A has remarkable compatibility with these types of polymeric materials and can be used as the entire vehicle or as the major part thereof in making coating compositions based on such polymers if there is also provided in the coating compositions a drier or siccative, that is, a polyvalent metal-containing complex or salt that catalyzes the oxidative curing of the mixture of the polymeric materials and DCP(M)A, and a volatile stabilizer to inhibit air-drying of the oxidation catalyst-containing coating composition until it has been applied to the substrate to be coated or impregnated.

In such coating compositions, the DCP(M)A is a non-volatile reactive monomeric component and is used alone to provide such a non-volatile reactive component in the composition or is used in conjunction with one or more additional non-volatile reactive monomers selected from (1) higher ($C_{10}$–$C_{20}$) alkyl and ($C_{10}$–$C_{20}$) alkenyl acrylates and methacrylates, (2) di($C_4$–$C_8$)alkyl fumarates, maleates, and itaconates, and (3) polyethylenically unsaturated monomers including polyol polyacrylates or polyol polymethacrylates, e.g., ethylene glycol di(meth)acrylate (Note: by placing the "meth" in parenthesis, it is intended to embrace generically both the diacrylate per se and the dimethacrylate per se without having to repeat the names of the individual compounds—this simplification to avoid repetition of named compounds occurs in numerous other places in the specification), trimethylolpropane tri(meth)acrylate, neopentyl glycol di(meth)acrylate, 1,6-hexanediol di(meth)acrylate, 1,3-and 1,4-butanediol di(meth)acrylate, and pentaerythritol tri- and tetra-(meth)acrylate.

Examples of (1) in the preceding paragraph include decyl (meth)acrylate, isodecyl (meth)acrylate, undecyl (meth)acrylate, lauryl (meth)acrylate, cetyl (meth)acrylate, pentadecyl (meth)acrylate, hexadecyl (meth)acrylate, octadecyl (meth)acrylate, oleyl (meth)acrylate, linoleyl (meth)acrylate, and linolenyl (meth)acrylate. Examples of reactive monomer (2) in the preceding paragraph include the dibutyl, dihexyl, and di(2-ethylhexyl) esters of fumaric, maleic, and itaconic acids.

When using, as the entire vehicle or as a part thereof, in these coating compositions a non-volatile reactive monomer component comprising DCP(M)A in conjunction with a siccative, this portion of the vehicle in effect may be considered to raise the solids proportion in the composition. Yet the non-volatile DCP(M)A-containing reactive monomer is a liquid which has compatibility with the film-forming binder polymer so that substantially less volatile solvent is needed to adjust the viscosity of the coating composition for application. Thus, when it is desired to minimize the amount used of volatile non-reactive solvent in the coating compositions, the reduction in viscosity of the compositions to a suitable level for application in any particular way (spraying, brushing, roll-coating, etc.) can be effected in most, if not all instances by adjusting the proportion of the non-volatile reactive component. Such component may consist of DCP(M)A or it may consist of a mixture of a major amount of DCP(M)A and a minor amount of (1) higher ($C_{10}$–$C_{20}$) aliphatic alcohol esters of acrylic or methacrylic acid as mentioned above or (2) di($C_4$–$C_8$) alkyl fumarates, maleates, or itaconates, or (3) polyethylenically unsaturated monomers of category (3) above. It is to be understood that, in practice, a proportion of volatile, non-reactive diluent or solvent may be incorporated as a part of the vehicle in the coating composition to be applied in proportions stated hereinafter, but it is preferred in many instances to use such a solvent in small proportions, if at all.

The essential binder-forming components of the coating compositions of the present invention are:
(a) A film-forming polymeric binder having a molecular weight in the range of 20,000 to 350,000 viscosity average selected from the group consisting of:
  (1) Thermoplastic vinyl addition polymers of one or more monomers consisting of monoethylenically unsaturated monomers having a single unsaturated group of the formula $H_2C=C<$,
  (2) Polyvinyl acetals obtained from an aliphatic ($C_2$–$C_8$) aldehyde, and
  (3) Chlorinated polyisoprene containing about 64–65% by weight of chlorine;
(b) A liquid non-volatile reactive monomer selected from the group consisting of:
  (A) At least one of dicyclopentenyl acrylate acrylate or dicyclopentenyl methacrylate, and
  (B) Blends of at least one of dicyclopentenyl acrylate or dicyclopentenyl methacrylate and at least one compound selected from the group consisting of
    (1) Higher aliphatic ($C_{10}$–$C_{20}$) alcohol esters of (meth)acrylic acid,
    (2) Di($C_4$–$C_8$)alkyl fumarates, maleates, and itaconates, and
    (3) Polyethylenically unsaturated monomers.

To the binder-forming components (a) and (b) there is added:
(c) An effective amount of a polyvalent metal-containing complex or salt that catalyzes the oxidative curing of (a) and (b); and
(d) A volatile oxime stabilizer that is capable of inhibiting the oxidizing action of (c).

The composition set forth hereinabove provides a coating composition that can be stored for months in containers without hardening or setting; nevertheless when the compositions are used for coating substrates exposed to air in the normal fashion, the films are cured rapidly by autoxidation, no precaution need be taken to exclude air since the compositions of the present invention depend on the presence of oxygen of the ambient air to cure.

There may also be included a volatile solvent in an amount of about 30% to 70% by weight, but preferably not over about 60% by weight, of the entire weight of formulated coating composition ready for application, which may include a pigment and/or filler, a dispersing agent therefor, and/or other materials conventionally used in paints, varnishes, and lacquers. Besides the film-forming component (a) there may also be present various addition or condensation polymers, the compatibilizing effect of the DCP(M)A favoring such inclusion.

Thus, the reactive monomer component (b) may comprise besides the DCP(M)A up to 40% by weight of other non-volatile reactive monomer, e.g., the long-chain aliphatic alcohol (meth)acrylate. This component of the compositions may serve as the entire vehicle so that essentially no volatile solvent component is employed, thereby obtaining a composition that may be considered to be 100% solids in that all components serve to develop the solid resinous mass upon oxidation and polymerization resulting from the inclusion of a polyvalent metal-containing complex or salt. Whereas the most advantageous compositions from the standpoint of control of pollution, minimization of the risks of flammability and toxicity to personnel employing the compositions are those of at least 30% and preferably 40% to 60%, solids characteristic, nevertheless, the invention also contemplates compositions wherein an amount of volatile solvent may be employed in conjunction with the liquid monomeric component above described to facilitate adjustment of viscosity for application by brushing, spraying, or otherwise, the proportion of volatile solvent being not over about 70% by weight, and preferably not over 60% by weight, of the entire weight of the coating composition.

The compositions containing the main two components (a) and (b) spelled out hereinabove may be prepared and stored before they are used. Even compositions containing the three components (a), (b), and (c) can be prepared and stored if certain precautions are taken. Normally such storing, especially of the three-component compositions, should be accomplished in sealed containers where availability of air or oxygen is avoided. However, the two components (a) and (b) with whatever other auxiliary components are to be used in the composition (other than component (c) or, if used, a volatile polymerization inhibitor or stabilizer (d)) may be mixed and stored until the user is ready to employ the coating composition at which time component (c) is added with or without the inhibitor or stabilizer (d).

The relative proportions between the several essential components mentioned may be as follows. The amount of reactive monomer component (a) including DCPA or DCPMA may range from about 5% to about 70% of the total amount of components (a) and (b). However, preferred compositions contain component (a) in an amount of about 10% to 60% by weight of (a) + (b). The proportion of component (c) may be quite low and is generally used in the amount of 0.0005 to 2% metal content by weight of (a) + (b). Component (c) may be added to the composition prior to storage before use provided such addition is made in the absence of peroxy polymerization initiators and/or free oxygen and provided a volatile oxime stabilizer or inhibitor is included in the composition to prevent the oxidizing action of the drier and the composition is placed in closed storage containers to prevent volatilization of the oxime inhibitor during storage. The stabilizer may be used in a small proportion of 0.1% to 2% by weight based on the weight of components (a) + (b).

Component (c) is any polyvalent metal-containing complex or salt that catalyzes the oxidative curing of drying oils of drying oil-modified alkyd resin. These polyvalent metal-containing complexes or salts are known in the drying oil or drying oil-modified alkyd resin art as "siccatives" or "driers." Examples are various polyvalent metal salts including calcium, copper, zinc, manganese, lead, cobalt, iron and zirconium as the cation. Simple inorganic salts are useful such as the halide, chloride, nitrate, sulfate. However, in circumstances where the vehicle is of organic nature such as those of the present invention, it is frequently preferred to use salts of organic acids such as the acetylacetonate, acetate, propionate, butyrate and the like. Complex reaction products of metal oxides, acetates, or borates and vegetable oils are also useful. Generally, the most useful driers are salts of naphthenic acids or of ($C_8$ to $C_{30}$)aliphatic acids. Examples of the polyvalent metal include calcium, copper, zinc, manganese, lead, cobalt, iron, and zirconium. Examples of the aliphatic or fatty acid component or anion of the polyvalent metal-containing salt is that of naphthenic acids, resinic acids, (that is, rosin acids), tall oil fatty acids, linseed oil fatty acids, 2-ethylhexoic acid, lauric acid, palmitic acid, myristic acid, stearic acid, oleic acid, linoleic acid, linolenic acid, behenic acid, cerotic acid, montanic acid, and abietic acid. Preferred complexes or salts are those of cobalt and manganese, such as cobalt octoate, cobalt naphthenate and manganese octoate and naphthenate. Mixtures of various complexes or salts may be used. The polyvalent metal-containing complexes or salts may be a member of the group of driers mentioned in "Encyclopedia of Chemical Technology," Kirk-Othmer, Volume 5, pages 195–205, published by Interscience Encyclopedia, Inc., N.Y. (1950).

Component (d) is a volatile oxime, i.e. a volatile ketone-oxime (ketoxime) or aldehyde-oxime (aldoxime), which forms a complex with the metal of the siccative so that on mixing the oxime and the siccative with the composition, the autoxidizing action of the siccative is prevented by virtue of the complexing action of the oxime. The oxime thus stabilizes the composition for months while stored in closed, i.e. sealed containers or packages. Upon using the stored composition to form coating films, the oxime evaporates shifting the equilibrium so that the drier metal is freed from the oxime-drier metal complex and exerts rapid autoxidative action on the film forming components of the composition. The rapidity of setting can be varied by selection of the oxime in respect to its volatility.

In general, oximes of any ketone having from 3–10 carbon atoms, preferably those in which the substitutents of the ketone-carbon atom are selected from alkyl groups and saturated alicyclic groups, and oximes of any aldehyde preferably a saturated aliphatic aldehyde having from 1–10 carbon atoms, have sufficient volatility to assure rapid autoxidation upon forming coating films from compositions of the invention. Examples of these oximes are methyl ethyl ketone-oxime, methyl butyl ketone-oxime, 5-methyl-3-heptanone-oxime, cyclohexanone-oxime, and butyraldehyde-oxime. Addition of such inhibitors is essential if long stability and pot life of the blends of components (a), (b) and (c) is desired.

By using a blend of non-volatile reactive monomers, it is possible to vary the properties in the final cured product. For example increasing the proportion of ($C_{10}$–$C_{20}$)-aliphatic alcohol (meth)acrylate relative to the DCP(M)A results in reducing any tendency to excessive hardness and thereby improves the toughness in the air-dried product. The di($C_4$–$C_8$)alkyl fumarates, maleates and itaconates contribute in a similar way to modify hardness and toughness obtained with DCP(M)A. The inclusion of the non-volatile polyethylenically unsaturated reactive monomer, such as glycol di(meth)acrylate improves chemical-resistances, including water-resistance, organic solvent resistance, alkali-resistance, weathering-resistance, block-resistance, print-resistance, etc.

One advantage of the present invention that could not be predicted is the increased rate of cure through the entire thickness of the coating, especially when the film-forming polymer is of hard type, such as polystyrene, poly(methyl methacrylate) or copolymers having large proportions of monomers which are of a type that on homopolymerization produce hard films, such as styrene, methyl methacrylate, ethyl methacrylate, n-butyl methacrylate, isobutyl methacrylate, sec-butyl methacrylate, acrylonitrile, vinyl chloride, vinylidene chloride, and vinyl acetate. In conventional organic solvent solutions of such hard polymers, there is often a strong tendency to cure at the surface or skin of the coating and this reduces the speed of migration of the volatile organic solvent within the composition. In contrast with this type of lacquer, the inclusion of the non-volatile reactive monomer consisting of or comprising DCP(M)A in conjunction with a siccative, that is, a polyvalent metal-containing complex or salt, in accordance with the present invention increases the rate of cure throughout the thickness of the film. It may be theorized that the non-volatile reactive monomer including DCP(M)A acts as a plasticizer during the air-drying by siccative, possibly thereby allowing solvent to diffuse through the film at an accelerated rate. However, the present invention is not to be limited to any particular theory of operation.

The following examples are illustrative of the invention, parts and percentages being by weight and temperatures in Centigrade, unless expressly stated otherwise.

EXAMPLE 1

Acrylic resin coatings of improved applications solids and viscosity, as well as improved hardness, are prepared by mixing the DCPMA as follows:

|  | Coating Compositions (Parts) | |
|---|---|---|
|  | A (Control) | B |
| Acrylic resin (40%)* | 200 | 200 |
| DCPMA | — | 20 |
| Cobalt naphthenate (6% Co) | — | 0.2 |
| Total | 200 | 220.2 |
| Effective Solids Content (wt. %) | 40.0 | 45.5 |
| Viscosity (Gardner-Holdt, 25° C) | Z1 | W |

*A 40 percent solids solution in mineral thinner of a free radical homopolymer of n-butyl methacrylate having Mw of about 200,000 and Mn of about 30,000 by Gel Permeation Chromatography.

The coatings are applied to steel panels to yield 1.8 mil films when dry. After 2 weeks air drying the coatings have the following properties:

|  | Coating | |
|---|---|---|
|  | A | B |
| Tukon Hardness (KHN) | 0.8 | 1.2 |
| Pencil Hardness | HB | F |
| Mandrel Flexibility | ⅛" | ⅛" |

EXAMPLE 2

Polystyrene clear coatings having improved application solids and hardness development are prepared by mixing the following:

|  | Coating (Parts by Weight) | | | |
|---|---|---|---|---|
|  | A (Control) | B | C (Control) | D |
| Polystyrene Resin 1* | 10.00 | 8.00 | — | — |
| Polystyrene Resin 2** | — | — | 10.00 | 8.00 |
| DCPMA | — | 8.00 | — | 8.00 |
| Toluene | 10.00 | 3.92 | 10.00 | 3.92 |
| Cobalt naphthenate (6% Co) | — | 0.08 | — | 0.08 |
| Total | 20.00 | 20.00 | 20.00 | 20.00 |
| Effective Solids Content (wt. %) | 50 | 80 | 50 | 80 |
| Viscosity (centistokes 25° C) | 225 | 130 | 450 | 275 |

*A clear, colorless thermoplastic polystyrene of 22,000 average molecular weight, 13–21 cps viscosity at 30% in toluene, and a softening range of 60–93° C. (available as Dow Resin PS-2, Dow Chemical Co.)
**A clear, colorless thermoplastic polystyrene of 35,000 average molecular weight, 33–50 cps viscosity at 30% in toluene, and a softening range of 93–116° C. (available as Dow Resin PS-3, Dow Chemical Co.)

The coatings are applied to steel test panels to yield 3-mil films when dry. After two weeks curing at ambient, the following properties are observed:

|  | Coating | | | |
|---|---|---|---|---|
|  | A | B | C | D |
| Tukon Hardness (KHN) | 2.3 | 11.6 | 7.1 | 18.2 |
| Pencil Hardness | 2B | HB | 2B | HB |
| Mandrel Flexibility | 6" | 6" | 6" | 6" |

After 5 months at ambient, the following properties are observed.

|  | Coating | | | |
|---|---|---|---|---|
|  | A | B | C | D |
| Tukon Hardness (KHN) | 7.9 | 17.9 | 17.9 | 19.0 |
| Pencil Hardness | B | HB | 2B | F |
| Cheesecloth Print* | Heavy | Light | Moderate-Heavy | Very Light |

*Weight is applied to press cheesecloth against coating at a pressure of 2 psi and assemblage placed in a 140° F oven for 1 hour. After cooling, the coatings are rated for the severity of imprinting by the cheesecloth fiber.

EXAMPLE 3

Polyvinyl butyral clear coating compositions of improved application solids are prepared by mixing the following:

|  | Coating (Parts by Weight) | | |
|---|---|---|---|
|  | A (Control) | B | C |
| Polyvinyl butyral resin* | 4.50 | 4.50 | 4.50 |
| DCPMA | — | 1.50 | 4.50 |
| Ethanol (95%) | 25.50 | 23.98 | 20.96 |
| Cobalt Naphthenate (6% Co) | — | 0.02 | 0.04 |
| Total | 30.00 | 30.00 | 30.00 |
| Effective Solids Content (wt. %) | 15 | 20 | 30 |
| Viscosity (Gardner-Holdt, 25° C) | Z-5 | Z-5 | Z-6 |

*A resin of 180,000–270,000 weight average molecular weight, 17.5–21.0% hydroxyl content expressed as polyvinyl alcohol, and a butyral content of 80% expressed as polyvinyl butyral (available as Butvar® B-72A, Monsanto).

The coatings are applied to steel test panels to yield 1-mil films when dry. After two weeks curing at ambient the following properties are observed.

|  | Coatings | | |
|---|---|---|---|
|  | A | B | C |
| Tukon Hardness (KHN) | 18.2 | 18.2 | 18.2 |
| Pencil Hardness | 4H | 5H | 5H |
| Mandrel Flexibility | ⅛" | ⅛" | 1¼" |

EXAMPLE 4

Vinyl chloride solution coatings of improved application solids are prepared by mixing the following:

|  | Coating (Parts by Weight) | | |
|---|---|---|---|
|  | A (Control) | B | C |
| Vinyl resin (100%)* | 5.00 | 4.62 | 4.00 |
| DCPMA | — | 1.54 | 4.00 |
| Methyl isobutyl ketone | 15.00 | 13.82 | 11.96 |
| Cobalt Naphthenate (6% Co) | — | 0.02 | 0.04 |
| Total | 20.00 | 20.00 | 20.00 |
| Effective solids content (wt. %) | 25.0 | 30.8 | 40.0 |
| Viscosity (centistokes) | 2100 | 950 | 575 |

*Copolymer of composition: vinyl chloride/vinyl acetate/vinyl alcohol = 91/3/6 by weight, molecular weight = 23,100, and glass transition temperature = 79° C (available as Bakelite® VAGH, Union Carbide).

The coatings are applied to steel test panels to yield 1-mil films when dry. After two weeks curing at ambient, the following properties are observed:

|  | Coating | | |
|---|---|---|---|
|  | A | B | C |
| Tukon Hardness (KHN) | 10.4 | 18.2 | 21.8 |
| Pencil Hardness | F | F | F |
| Mandrel Flexibility | 1¾" | 2" | 4" |

EXAMPLE 5

Chlorinated polyisoprene solution coatings of improved application solids are prepared by mixing the ingredients given below. In coating composition C, cetyl methacrylate is used to moderate the hardness of the coating.

|  | Coating Composition (Parts by Weight) | | |
|---|---|---|---|
|  | A (Control) | B | C |
| Chlorinated rubber (100%)[1] | 10.00 | 6.00 | 6.00 |
| DCPMA | — | 4.00 | 2.00 |
| Cetyl methacrylate[2] | — | — | 2.00 |
| Toluene | 15.00 | 10.00 | 10.00 |
| Cobalt Naphthenate (6% Co) | 0.10 | 0.10 | 0.10 |
| Methyl ethyl ketone oxime | 0.03 | 0.03 | 0.03 |
| Effective Solids Content (wt. %) | 40 | 50 | 50 |
| Viscosity (cps, 25° C) | 880 | 340 | 320 |

[1] Chlorinated rubber of 64–65 percent chlorine content having a density of 1.63 g/ml and a 20 percent toluene solution viscosity of about 20 cps (available as Parlon® S20, Hercules, Inc.).
[2] A crude mixture comprising (in side chain): $C_{16}$ = 2%; $C_{16'}$ 51%; $C_{18}$, 31%; $C_{20}$, 12%; $C_{20'}$ 1%.

The coatings are applied to steel test panels to yield 1.5-mil thick films when dry. After two weeks curing at ambient, the following properties are observed:

|  | Coating | | |
|---|---|---|---|
|  | A | B | C |
| Tukon Hardness (KHN) | 17.9 | 21.7 | 14.0 |
| Pencil Hardness | H | 2H | F |

EXAMPLE 6

Increased solids DCPMA — Modified Chlorinated Rubber Topcoat Composition for a Maintenance Paint System.

TiO₂ pigmented white topcoats based on chlorinated polyisoprene are prepared according to the following recipes. Coating A is a conventional acrylic resin modified type and coating B is similarly formulated to an equal resin solids replacement with DCPMA.

|  | Paint (Parts by Weight) | |
|---|---|---|
|  | A (Control) | B |
| Ball Mill Grind to Hegman 7 |  |  |
| Rutile TiO₂ | 13.1 | 13.1 |
| Chlorinated Rubber Resin (100%)[1] | 13.1 | 13.1 |
| Chlorinated Paraffin Plasticizer[2] | 4.4 | 4.4 |
| Xylene | 17.5 | 17.5 |
| Let Down/Spray Viscosity Adjustment |  |  |
| Acrylic Resin (100%)[3] | 8.7 | — |
| DCPMA | — | 8.7 |
| Cobalt Naphthenate (6% Co) | — | 0.26 |
| Toluene | 2.2 | — |
| Xylene | 70.6 | 42.0 |
| Total | 129.6 | 99.06 |
| Spray viscosity (Sec., #4 Ford Cup) | 20 | 20 |
| Spray solids | 30.3 | 39.8 |

[1] Chlorinated rubber of 65 percent chlorine content having a density of 1.6 g/ml and a viscosity of 9-12 cps for a 20 percent solution in toluene (available as Alloprene® 10, ICI America).
[2] Chlorinated paraffin of approximately 42 percent chlorine content having a viscosity of approximately 25 cps at 25° C (available as Cereclor® 42P, ICI America).
[3] A free radical copolymer of monomeric composition: ethyl acrylate, 27.5 parts; butyl acrylate, 12.5 parts, methyl methacrylate, 60 parts. Viscosity is approximately 6500 cps at 45 percent in toluene.

The coatings are spray-applied to cold rolled steel test panels to yield 2.5-mil films when dry. After one week of drying at ambient, the following properties are observed:

|  | Paint | |
|---|---|---|
|  | A | B |
| Tukon Hardness (KHN) | 1.2 | 11.8 |
| Pencil Hardness | 4B | B |
| Specular Gloss (20°/60°) | 48/79 | 75/90 |
| Scrub Resistance, Gardner, with a 20% aqueous solution of Industrial Cleaner DW-9. (M-CHEM Company, New Orleans, La.) | Fair | Good |

EXAMPLE 7

Acrylic resin coatings of improved applications viscosity, improved hardness and rate of development thereof, and decreased thermoplasticity of the air-dried film are prepared by mixing the following:

|  | Coating (Parts by Weight) | | | | |
|---|---|---|---|---|---|
|  | A (Control) | B | C | D | E |
| Acrylic Resin (40%)* | 40.00 | 38.00 | 36.00 | 32.00 | 24.00 |
| DCPMA | — | 0.80 | 1.60 | 3.20 | 6.40 |
| Toluene | — | 0.89 | 2.09 | 4.49 | 9.29 |
| Cobalt Naphthenate (6% Co) | — | 0.27 | 0.27 | 0.27 | 0.27 |
| Methyl Ethyl Ketone Oxime | — | 0.04 | 0.04 | 0.04 | 0.04 |
| Total | 40.00 | 40.00 | 40.00 | 40.00 | 40.00 |
| Effective Solids Content (wt.%) | 40 | 40 | 40 | 40 | 40 |
| Viscosity (Centistokes 25° C) | 625 | 650 | 550 | 300 | 110 |
| Resin/DCPMA wt. ratio | 100/0 | 95/5 | 90/10 | 80/20 | 60/40 |

*A 40 percent solids solution in toluene of a free radical copolymer of methyl methacrylate (55 parts) and ethyl acrylate (45 parts) having a viscosity average molecular weight of about 70,000.

The coatings are applied to steel test panels to yield 1-mil films when dry. The films are monitored for hardness development as given below:

| | Coating (Tukon Hardness, KHN) | | | | |
|---|---|---|---|---|---|
| | A* | B | C | D | E |
| 1 day | 1.2 | 1.0 | 1.0 | 1.2 | 0.6 |
| 2 days | 1.5 | 0.9 | 1.1 | 4.5 | 3.8 |
| 3 days | 2.3 | 1.3 | 2.9 | 7.4 | 7.8 |
| 8 days | 2.5 | 2.1 | 4.1 | 7.2 | 8.7 |

*A duplicate panel of coating A baked at 300° F for 30 minutes to thoroughly remove solvent has a hardness of 9.0 KHN.

After 18 days the coatings exhibit thermoplasticity values measured by the print test described in Example 2 (except for a test temperature of 120° F.) as follows

| Coating | | | | |
|---|---|---|---|---|
| A | B | C | D | E |
| Print heavy | heavy | heavy | moderate | moderate-heavy |

EXAMPLES 8–14

Comparable results are obtained when the DCPMA used in the preceding examples 1–7 is replaced with the same amount by weight of DCPA.

EXAMPLES 15–21

Comparable results are obtained when the DCPMA used in the preceding examples 1–7 is replaced with the same amount by weight of a mixture of 50:50 weight ratio of DCPA and DCPMA.

What is claimed is:

1. An autoxidizable coating composition comprising:
   (a) A film-forming polymeric binder having a molecular weight in the range of 20,000 to 350,000 viscosity average selected from the group consisting of:
      (1) Thermoplastic vinyl addition polymers of one or more monomers consisting of monoethylenically unsaturated monomers having a single unsaturated group of the formula $H_2C=C<$,
      (2) Polyvinyl acetals obtained from an aliphatic ($C_2$–$C_8$) aldehyde, and
      (3) Chlorinated polyisoprene containing about 64–65% by weight of chlorine;
   (b) A liquid non-volatile reactive monomer selected from the group consisting of:
      (A) At least one of dicyclopentenyl acrylate or dicyclopentenyl methacrylate, and
      (B) Blends of at least one of dicyclopentenyl acrylate or dicyclopentenyl methacrylate and at least one compound selected from the group consisting of
         (1) Higher aliphatic ($C_{10}$–$C_{20}$) alcohol esters of (meth)acrylic acid,
         (2) Di($C_4$–$C_8$)alkyl fumarates, maleates, and itaconates, and
         (3) Polyethylenically unsaturated monomers;
   (c) An effective amount of a polyvalent metal-containing complex or salt that catalyzes the oxidative curing of (a) and (b); and
   (d) A volatile oxime stabilizer that is capable of inhibiting the oxidizing action of (c).

2. A composition according to claim 1 wherein the proportion of non-volatile reactive monomer (b) is from about 5% to about 70% by weight of the total weight of (a) and (b).

3. A composition according to claim 1 wherein the proportion of non-volatile reactive monomer (b) is from about 10% to about 60% by weight of the total weight of (a) and (b).

4. A composition according to claim 1 wherein the component (c) is used in an amount of 0.0005 to 2% metal content by weight of the sum of (a) and (b).

5. A composition according to claim 1 wherein the component (c) is used in an amount of 0.0005 to 2% metal content by weight of the sum of (a) and (b) and a volatile oxime stabilizer is used in an amount of about 0.1% to 2% by weight of the total weight of components (a) and (b).

6. A composition according to claim 1 wherein the film-forming component is a polyvinyl butyral.

7. A composition according to claim 1 wherein the film-forming component is a styrene polymer.

8. A composition according to claim 1 wherein the film-forming component is a vinyl chloride polymer.

9. A composition according to claim 1 wherein the film-forming component is a (meth)acrylic acid ester polymer.

10. The air-dried film product of the composition of claim 1.

11. The air-dried film product of the composition of claim 5.

12. The air-dried film product of the composition of claim 6.

13. The air-dried film product of the composition of claim 7.

14. The air-dried film product of the composition of claim 8.

15. The air-dried film product of the composition of claim 9.

* * * * *